US011418607B2

(12) United States Patent
Park et al.

(10) Patent No.: US 11,418,607 B2
(45) Date of Patent: Aug. 16, 2022

(54) SERVER APPARATUS AND CONTROLLING METHOD THEREOF

(71) Applicant: Samsung Electronics Co., Ltd., Suwon-si (KR)

(72) Inventors: Mooserk Park, Suwon-si (KR); Youngmin Ko, Suwon-si (KR); Jeahwan Go, Suwon-si (KR); Ara Cho, Suwon-si (KR); Changjoo Chai, Suwon-si (KR); Miyoung Yoo, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 17/162,488

(22) Filed: Jan. 29, 2021

(65) Prior Publication Data

US 2021/0250410 A1  Aug. 12, 2021

(30) Foreign Application Priority Data

Feb. 11, 2020  (KR) ........................ 10-2020-0016473

(51) Int. Cl.
  *H04L 67/51*  (2022.01)
  *H04L 67/10*  (2022.01)
(52) U.S. Cl.
  CPC .............. *H04L 67/16* (2013.01); *H04L 67/10* (2013.01)
(58) Field of Classification Search
  CPC ................................ H04L 67/10; H04L 67/16
  (Continued)

(56) References Cited

U.S. PATENT DOCUMENTS 7,610,398 B2  10/2009  Fricke et al.
8,046,406 B2  10/2011  Fricke et al.
(Continued)

FOREIGN PATENT DOCUMENTS

JP  2011-076322 A  4/2011
JP  2017-017513 A  1/2017
(Continued)

OTHER PUBLICATIONS

Google Patents English Machine Translation of KR 10-2018-0047474, 8 pages (Year: 2021).*
(Continued)

*Primary Examiner* — Wing F Chan
*Assistant Examiner* — Leon Y Tseng
(74) *Attorney, Agent, or Firm* — Jefferson IP Law, LLP

(57) ABSTRACT

An electronic apparatus and a controlling method thereof are provided. A server apparatus communicatively connected with a plurality of electronic apparatuses constituting an internet of things (IoT) includes a communication interface, and a processor configured to, based on receiving a request of a service from an application executed in a user terminal apparatus being received through the communication interface, determine data corresponding to the request and an electronic apparatus for receiving the data among the plurality of electronic apparatuses, determine a time cycle for receiving the data from the electronic apparatus based on the service, control the communication interface to transmit a request for transmitting the data according to the time cycle to the electronic apparatus, and based on receiving the data from the electronic apparatus at an interval of the time cycle through the communication interface, provide the service based on the received data.

20 Claims, 14 Drawing Sheets

(58) Field of Classification Search
USPC .......................................................... 709/219
See application file for complete search history.

(56) References Cited

U.S. PATENT DOCUMENTS

| | | | |
|---|---|---|---|
| 9,743,402 B2* | 8/2017 | Suresh | H04B 7/2656 |
| 10,932,281 B2 | 2/2021 | Kim et al. | |
| 2006/0265524 A1 | 11/2006 | Fricke et al. | |
| 2010/0042683 A1 | 2/2010 | Fricke et al. | |
| 2017/0085633 A1 | 3/2017 | Kim et al. | |
| 2018/0007630 A1* | 1/2018 | Nacer | H04W 52/0235 |
| 2018/0081730 A1 | 3/2018 | Duttagupta et al. | |
| 2019/0037578 A1 | 1/2019 | Kim et al. | |
| 2019/0174520 A1 | 6/2019 | Pang et al. | |
| 2019/0294128 A1* | 9/2019 | Delaney | G05B 15/02 |
| 2020/0137444 A1* | 4/2020 | Yoo | H04N 21/4394 |
| 2021/0087732 A1* | 3/2021 | Park | D06F 33/00 |

FOREIGN PATENT DOCUMENTS

| | | |
|---|---|---|
| KR | 10-2005-0122207 A | 12/2005 |
| KR | 10-2014-0054694 A | 5/2014 |
| KR | 10-1467748 B1 | 12/2014 |
| KR | 10-1602760 B1 | 3/2016 |
| KR | 10-2018-0047474 A | 5/2018 |
| KR | 10-2018-0075177 A | 7/2018 |
| KR | 10-2019-0011496 A | 2/2019 |
| KR | 10-2019-0064066 A | 6/2019 |

OTHER PUBLICATIONS

Apilo et al., Evaluation of Cellular IoT for Sport Wearables, 2019 IEEE 30th Annual International Symposium on Personal, Indoor and Mobile Radio Communications (PIMRC) Workshops—W5: Second Int. Workshop on IoT Enabling Technologies in Healthcare, Sep. 8, 2019.

International Search Report dated May 6, 2021, issued in International Patent Application No. PCT/KR2021/001386.

* cited by examiner

SERVER APPARATUS AND CONTROLLING METHOD THEREOF

CROSS-REFERENCE TO RELATED APPLICATION(S)

This application is based on and claims priority under 35 U.S.C. § 119(a) of a Korean patent application number 10-2020-0016473, filed on Feb. 11, 2020 in the Korean Intellectual Property Office, the disclosure of which is incorporated by reference herein in its entirety.

BACKGROUND

1. Field

The disclosure relates to a server apparatus and a controlling method thereof. More particularly, the disclosure relates to a server apparatus that controls an upload cycle of data, and a controlling method thereof.

2. Description of Related Art

Currently, for controlling operations of various electronic apparatuses or providing state information of various electronic apparatuses, etc., through a terminal apparatus of a user, a technology of transmitting and receiving data of electronic apparatuses through a server apparatus is being utilized.

In general, an electronic apparatus may upload data acquired in real time on a server apparatus, and the server apparatus may manage data for each user account, and transmit data to a terminal apparatus of a user. Then, the terminal apparatus may provide information to the user by displaying state information of the electronic apparatus, etc., or perform a specific service by utilizing the data of the electronic apparatus.

Meanwhile, in case an electronic apparatus uploads data of which purpose of use is not clear among data on a server apparatus, there are problems that the traffic of the server apparatus is exceeded, and data that is not used is accumulated in the server apparatus. Also, according to the trend that the number of electronic apparatuses using a server apparatus is gradually increasing, there is a problem that the amount of data uploaded on a server also increases, and thus the communication load of the server also rapidly increases.

In addition, problems as above make expansion of servers inevitable, which leads to a problem that the management cost of the manufacturer or the service provider increases.

The above information is presented as background information only to assist with an understanding of the disclosure. No determination has been made, and no assertion is made, as to whether any of the above might be applicable as prior art with regard to the disclosure.

SUMMARY

Aspects of the disclosure are to address the above-mentioned problems and/or disadvantages and to provide at least the advantages described below. Accordingly, an aspect of the disclosure is to provide an electronic apparatus that makes data transmitted effectively to an external apparatus, and a controlling method thereof.

Additional aspects will be set forth in part in the description which follows and, in part, will be apparent from the description, or may be learned by practice of the presented embodiments.

In accordance with an aspect of the disclosure, a server apparatus communicatively connected with a plurality of electronic apparatuses constituting an internet of things (IoT) for achieving the aforementioned purpose is provided. The server apparatus includes a communication interface, and a processor configured to, based on receiving a request of a service from an application executed in a user terminal apparatus being received through the communication interface, determine data corresponding to the request and an electronic apparatus for receiving the data among the plurality of electronic apparatuses, determine a time cycle for receiving the data from the electronic apparatus based on the service, control the communication interface to transmit a request for transmitting the data according to the time cycle to the electronic apparatus, and based on receiving the data from the electronic apparatus at an interval of the time cycle through the communication interface, in response to the request for transmission, provide the service based on the received data.

The time cycle may include a time interval of transmitting the data acquired by the electronic apparatus to the server apparatus again after transmitting the data acquired by the electronic apparatus to the server apparatus, and the electronic apparatus may, based on receiving a request for transmitting the data, transmit the data acquired by the electronic apparatus to the server apparatus, and transmit the data acquired by the electronic apparatus to the server apparatus at a time point that passed the time cycle.

Meanwhile, the data may include at least one of data for the state of the electronic apparatus acquired from the electronic apparatus or data for the surrounding environment acquired from the electronic apparatus.

Meanwhile, the time cycle may be predetermined according to the service.

The processor may, based on the requested service being a first service, determine that the time cycle by which the electronic apparatus will transmit the data to the server apparatus is a first time cycle, and based on the requested service being a second service, determine that the time cycle by which the electronic apparatus will transmit the data to the server apparatus is a second time cycle longer than the first time cycle.

Meanwhile, the processor may, based on receiving information indicating that provision of the service was completed, or execution of the application was finished from the user terminal apparatus, transmit a request for stopping transmission of the data to the electronic apparatus through the communication interface.

Meanwhile, the processor may, based on receiving information indicating that provision of the service was completed, or execution of the application was finished from the user terminal apparatus, increase the time interval of the time cycle.

Meanwhile, the processor may determine the time cycle based on the number of times that the service was requested which was received through the communication interface during a predetermined time period.

Meanwhile, the processor may determine the time cycle based on at least one of the format of the data corresponding to the request received through the communication interface or the size of the data.

In accordance with another aspect of the disclosure, a method of controlling a server apparatus communicatively connected with a plurality of electronic apparatuses constituting an IoT is provided. The method of controlling a server apparatus includes the operations of, based on receiving a request of a service from an application executed in a user terminal apparatus, determining data corresponding to the request and an electronic apparatus for receiving the data among the plurality of electronic apparatuses, determining a time cycle for receiving the data from the electronic apparatus based on the service, transmitting a request for transmitting the data according to the time cycle to the electronic apparatus, and based on receiving the data from the electronic apparatus at an interval of the time cycle, in response to the request for transmission, providing the service based on the received data.

The time cycle may include a time interval of transmitting the data acquired by the electronic apparatus to the server apparatus again after transmitting the data acquired by the electronic apparatus to the server apparatus, and the electronic apparatus may, based on receiving a request for transmitting the data, transmit the data acquired by the electronic apparatus to the server apparatus, and transmit the data acquired by the electronic apparatus to the server apparatus at a time point that passed the time cycle.

Meanwhile, the data may include at least one of data for the state of the electronic apparatus acquired from the electronic apparatus or data for the surrounding environment acquired from the electronic apparatus.

Meanwhile, the time cycle may be predetermined according to the service.

The operation of determining the time cycle may include the operations of, based on the requested service being a first service, determining that the time cycle by which the electronic apparatus will transmit the data to the server apparatus is a first time cycle, and based on the requested service being a second service, determining that the time cycle by which the electronic apparatus will transmit the data to the server apparatus is a second time cycle longer than the first time cycle.

Meanwhile, the controlling method may further include the operation of, based on receiving information indicating that provision of the service was completed, or execution of the application was finished from the user terminal apparatus, transmitting a request for stopping transmission of the data to the electronic apparatus.

Meanwhile, the operation of determining the time cycle may further include the operation of, based on receiving information indicating that provision of the service was completed, or execution of the application was finished from the user terminal apparatus, increasing the time interval of the time cycle.

Meanwhile, in the operation of determining the time cycle, the time cycle may be determined based on the number of times that the service was requested which was received during a predetermined time period.

Meanwhile, in the operation of determining the time cycle, the time cycle may be determined based on at least one of the format of the data corresponding to the received request or the size of the data.

According to the various embodiments of the disclosure as described above, an electronic apparatus that makes data transmitted effectively to an external apparatus and a controlling method thereof can be provided.

According to an embodiment of the disclosure, indiscreet transmission of data of an electronic apparatus to an external apparatus can be prevented, and occurrence of traffic in accordance thereto can be minimized. Also, the server management cost of the manufacturer can be reduced, and an opportunity for reducing servers can be provided. Along with this, a seamless IoT experience can be provided to a user.

Other aspects, advantages, and salient features of the disclosure will become apparent to those skilled in the art from the following detailed description, which, taken in conjunction with the annexed drawings, discloses various embodiments of the disclosure.

BRIEF DESCRIPTION OF THE DRAWINGS

The above and other aspects, features, and advantages of certain embodiments of the disclosure will be more apparent from the following description taken in conjunction with the accompanying drawings, in which.

Throughout the drawings, like reference numerals will be understood to refer to like parts, components, and structures.

DETAILED DESCRIPTION

Figure 1:
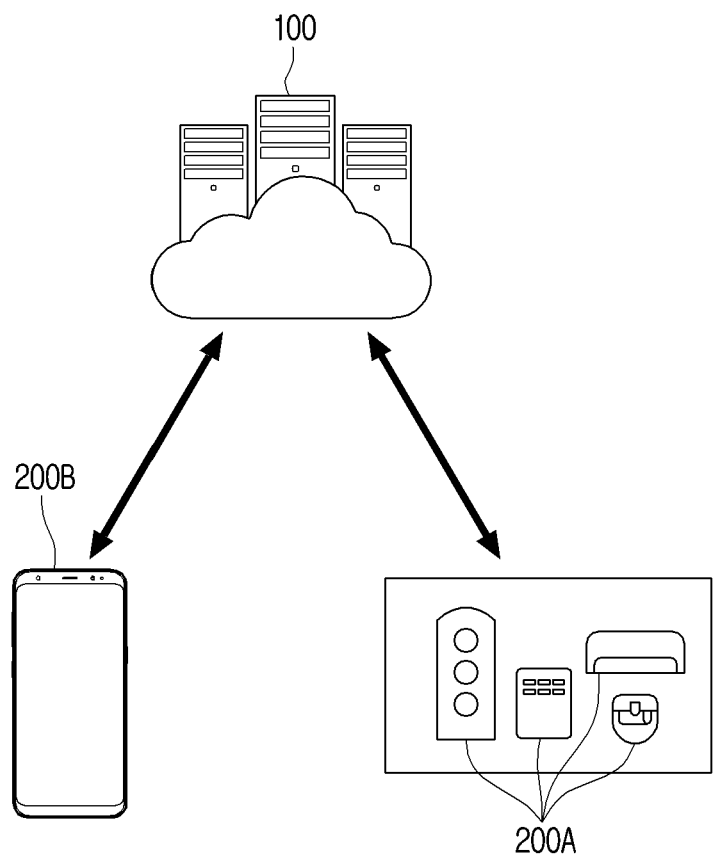
FIG. 1 is a diagram for illustrating a system according to an embodiment of the disclosure.

The following description with reference to the accompanying drawings is provided to assist in a comprehensive understanding of various embodiments of the disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the disclosure. Accordingly, it should be apparent to those skilled in the art that the following description of various embodiments of the disclosure is provided for illustration purpose only and not for the purpose of limiting the disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

Also, the various embodiments of the disclosure are not for limiting the technology described in the disclosure to a specific embodiment, but they should be interpreted to include various modifications, equivalents, and/or alternatives of the embodiments of the disclosure. Meanwhile, with respect to the detailed description of the drawings, similar components may be designated by similar reference numerals.

In addition, expressions such as "first," "second," and the like used in the disclosure may describe various components regardless of any order and/or degree of importance, and they are used only to distinguish one component from another component, and are not intended to limit the components.

Further, in the disclosure, the expressions "A or B," "at least one of A and/or B," or "one or more of A and/or B" and the like may include all possible combinations of the listed items. For example, "A or B," "at least one of A and B," or "at least one of A or B" may refer to all of the following cases: (1) including at least one A, (2) including at least one B, or (3) including at least one A and at least one B.

Further, in the disclosure, terms such as "include" and "consist of" should be construed as designating that there are such characteristics, numbers, operations, elements, components or a combination thereof described in the specification, but not as excluding in advance the existence or possibility of adding one or more of other characteristics, numbers, operations, elements, components or a combination thereof.

Meanwhile, the description in the disclosure that one element (e.g.: a first element) is "(operatively or communicatively) coupled with/to" or "connected to" another element (e.g.: a second element) should be interpreted to include both the case where the one element is directly coupled to the another element, and the case where the one element is coupled to the another element through still another element (e.g.: a third element). In contrast, the description that one element (e.g.: a first element) is "directly coupled" or "directly connected" to another element (e.g.: a second element) can be interpreted to mean that still another element (e.g.: a third element) does not exist between the one element and another element.

Also, the expression "configured to" used in the disclosure may be interchangeably used with other expressions such as "suitable for," "having the capacity to," "designed to," "adapted to," "made to," and "capable of," depending on circumstances. Meanwhile, the term "configured to" may not necessarily mean that a device is "specifically designed to" in terms of hardware. Instead, under some circumstances, the expression "a device configured to" may mean that the device "is capable of" performing an operation together with another device or component. For example, the phrase "a processor configured to perform A, B, and C" may mean a dedicated processor (e.g.: an embedded processor) for performing the corresponding operations, or a generic-purpose processor (e.g.: a central processing unit (CPU) or an application processor) that can perform the corresponding operations by executing one or more software programs stored in a memory device.

FIG. 1 is a diagram for illustrating a system according to an embodiment of the disclosure.

Referring to FIG. 1, a system 1 according to an embodiment of the disclosure may include a server apparatus 100 and electronic apparatuses 200A and 200B.

The server apparatus 100 may refer to an electronic apparatus that collects and processes data of an external apparatus. For example, the server apparatus 100 may not only be implemented as an apparatus that performs a function dedicated to a server such as a cloud server, etc., but also be implemented as various electronic apparatuses such as a smartphone, a tablet, a wearable device, a personal computer (PC), a smart (television) TV, a smart speaker, an artificial intelligence speaker, an air conditioning device, a refrigerator, etc., that can perform a function of a server along with other functions. However, this is merely an example, and it is also possible that the server apparatus 100 is implemented as electronic apparatuses in various types that are not listed above. Also, the server apparatus 100 may be implemented as one apparatus, or implemented as an assembly consisting of a plurality of apparatuses.

The server apparatus 100 may transmit and receive data with the electronic apparatuses 200A and 200B. For this, the server apparatus 100 may be connected with the electronic apparatuses 200A and 200B via a network through various communication methods. For example, the server apparatus 100 may receive data from the electronic apparatuses 200A and 200B, or transmit data to the electronic apparatuses 200A and 200B.

Also, the server apparatus 100 may register the electronic apparatuses 200A and 200B to an account of a user, and share data between the electronic apparatuses 200A and 200B registered to the account of the user. That is, the server apparatus 100 may receive data of the electronic apparatus 200A, and transmit the received data to the electronic apparatus 200B. Also, the server apparatus 100 may receive data of the electronic apparatus 200B, and transmit the received data to the electronic apparatus 200A.

The electronic apparatuses 200A and 200B may include the electronic apparatus 200A constituting an Internet of Things (IoT) and the user terminal apparatus 200B. The Internet of Things (IoT) may mean a state wherein any one electronic apparatus among a plurality of electronic apparatuses provides (or shares) data to/with another electronic apparatus, or a plurality of electronic apparatuses are connected directly or connected indirectly through a network (or the Internet), so that they can control another electronic apparatus.

The electronic apparatus 200A and the user terminal apparatus 200B are distinguished according to the roles that they perform, and the user terminal apparatus 200B means an apparatus that can control the electronic apparatus 200A among the plurality of electronic apparatuses constituting the IoT through a user command (e.g.: a touch input, a gesture input, a voice input, a key input, etc., of a user), or perform a specific service through data received from the electronic apparatus 200A. In this case, the user terminal apparatus 200B may be any one electronic apparatus among the plurality of electronic apparatuses constituting the IoT. Hereinafter, for the convenience of explanation, the apparatus that transmits data to the user terminal apparatus 200B through the server apparatus 100 will be referred to as the electronic apparatus 200A, and the apparatus that provides a specific service to a user by utilizing data received from the electronic apparatus 200A will be referred to as the user terminal apparatus 200B.

Meanwhile, the electronic apparatuses 200A and 200B may be implemented as at least one of a smartphone, a tablet, a robot, a computer, a smart TV, a smart speaker, an artificial intelligence speaker, an air conditioning device, a refrigerator, a digital video disk (DVD) player, an audio, a robot cleaner, a cleaner, an oven, a microwave oven, a washing machine, an air purifier, a set-top box, a home automation control panel, a security control panel, a TV box (e.g.: Samsung HomeSync™, Apple TV™, or Google TV™), a game console (e.g.: Xbox™, PlayStation™), a medical device, a vehicle, an electronic dictionary, a camcorder, an electronic picture frame, a point of sales (POS) of a store, various Internet of Things devices (e.g.: a light bulb, a lighting, various kinds of sensors, an electronic or gas meter, a sprinkler device, a fire alarm, a thermostat, a toaster, exercise equipment, a hot water tank, a heater, a boiler, etc.), or a wearable device. However, these are merely examples, and it is also possible that the electronic apparatuses 200A and 200B are implemented as various kinds of electronic apparatuses that are not listed above.

The electronic apparatus 200A may be one of the plurality of electronic apparatuses within the system 1 connected with the server apparatus 100. For example, the plurality of electronic apparatuses may be connected with the server apparatus 100 through a network router by using communication methods such as wireless fidelity (WiFi).

The electronic apparatus 200A may transmit the data of the electronic apparatus 200A to the server apparatus 100. Also, the electronic apparatus 200A may transmit the data of the electronic apparatus 200A sequentially acquired according to time to the server apparatus 100.

The data may include at least one of data for the state of the electronic apparatus 200A acquired from the electronic apparatus 200A or data for the surrounding environment acquired from the electronic apparatus 200A. Also, the data may include information on the time when the data was acquired.

Specifically, the data for the state may refer to information on the state of the internal environment of the electronic apparatus 200A. For example, the data for the state may include at least one of information on the state of the power (e.g.: a Power On state, a Power Off state, the remaining amount of the battery, etc.), the degree of progress of the operation that is currently being performed, the kind of the operation that is currently being performed (e.g.: a moving operation, an air purifying operation, a cleaning operation, etc.), whether an operation is currently being performed (e.g.: an operation is being performed, a stand-by state, etc.), the state of network connection (e.g.: an Online state, an Offline state), the kind of the device (e.g.: a robot cleaner, an air conditioning device, a refrigerator, a door sensor, a television (TV), etc.), or hardware components. The data for the surrounding environment may refer to information on detection of the external environment of the electronic apparatus 200A. For example, the data for the surrounding environment may include at least one of information on the concentration of fine dust (e.g.: PM10, PM2.5, PM1.0 units), the concentration of gas, the temperature, the humidity, the location of the electronic apparatus 200A, an image that photographed the surroundings, or whether the door is opened or closed.

Meanwhile, each electronic apparatus 200A may be implemented as devices of different types (e.g.: an air purifying device and a robot cleaning device, etc.). That is, in case an apparatus performs an operation of the electronic apparatus 200A described in the disclosure, the apparatus may be interpreted as the electronic apparatus 200A of the disclosure, regardless of the type or the main usage of the apparatus. In this case, the electronic apparatus 200A may acquire different types of data according to the type of the apparatus or the hardware components. For example, in case the electronic apparatus 200A is an air purifying device, it may acquire data for the concentration of fine dust, and in case the electronic apparatus 200A is an air conditioning device, it may acquire data for the temperature, and in case the electronic apparatus 200A is a robot cleaning device, it may acquire data for the current location of the robot cleaning device.

The user terminal apparatus 200B may transmit a request of a service to the server apparatus 100. For example, if a user command for performing a specific service is received, the user terminal apparatus 200B may transmit a request of the service to the server apparatus 100.

The service may refer to a function (or an operation) performed at the server apparatus 100 or the user terminal apparatus 200B by utilizing the data of the electronic apparatus 200A.

Also, a request of a service may include information on the type of the service that the user terminal apparatus 200B will perform. The type of the service may include types such as an automation service, a monitoring service, a notification service, etc. Meanwhile, the kind of the service can obviously further include various types other than the aforementioned types.

In the case of an automation service, it may refer to a service of executing an operation in the case of satisfying a condition. For this, rule information including information on a condition and an operation may be stored in the user terminal apparatus 200B or the server apparatus 100. The condition and the operation included in the rule information may be set or changed by a user or the manufacturer.

The data of the electronic apparatus 200A may be used in determining whether a condition is satisfied.

For example, in case rule information including a condition that "the indoor temperature is higher than or equal to a predetermined value (e.g.: 26 degrees)" and an operation that "the electronic apparatus 200A which is an air conditioning device performs cooling" is set, the indoor temperature (e.g.: a temperature identified through the electronic apparatus 200A which is a temperature sensor) may be compared with a predetermined value by the user terminal apparatus 200B or the server apparatus 100, and it may be determined whether the condition is satisfied according to whether the indoor temperature is higher than or equal to a predetermined value. In case the user terminal apparatus 200B or the server apparatus 100 determined that the condition was satisfied, it may transmit a command for controlling to perform a cooling operation to the electronic apparatus 200A which is an air conditioning device, and in this case, the electronic apparatus 200A may perform a cooling operation according to the received instruction.

As another example, in case rule information including a condition that "the current location of the user is within a predetermined place (e.g.: inside the home)" and an operation that "the electronic apparatus 200A which is a TV is turned on" is set, the current location of the user (e.g.: the location identified through the Global Positioning System (GPS) of the electronic apparatus 200A which is a smartphone) may be compared as to whether it is located within a predetermined place by the user terminal apparatus 200B or the server apparatus 100, and it may be determined whether the condition is satisfied. In case the user terminal apparatus 200B or the server apparatus 100 determined that the condition was satisfied, it may transmit a command for controlling to perform a turn-on operation to the electronic apparatus 200A which is a TV, and in this case, the electronic apparatus 200A may perform a turn-on operation according to the received instruction, and display an image on the screen.

A notification provision service may refer to a service that performs a function of providing a notification at the user terminal apparatus 200B or the server apparatus 100 according to the value (or the changed amount of the value) of the data of the electronic apparatus 200A (e.g.: the temperature, the concentration of fine dust, etc.).

As an example, a notification may be provided according to a result of comparing the value of the data of the electronic apparatus 200A with a predetermined reference value (e.g.: the value of the data is bigger or smaller than a predetermined reference value, etc.). The value of the data of the electronic apparatus 200A may be used in comparing with a predetermined reference value. For example, if a case wherein the data of the electronic apparatus 200A is the concentration value of fine dust is assumed, the user terminal apparatus 200B or the server apparatus 100 may determine whether the concentration value of fine dust exceeds a predetermined reference value (e.g.: 75 $\mu m/m^2$ at PM 2.5, etc.) through the data of the electronic apparatus 200A, and if it is determined that the concentration value of fine dust exceeds the predetermined reference value, a message notifying that the level of fine dust is bad may be provided at the user terminal apparatus 200B.

A monitoring service may refer to a service that performs a function of collecting the data of the electronic apparatus 200A and providing the collected data. For example, if a case wherein the data of the electronic apparatus 200A is the usage amount of energy is assumed, the user terminal apparatus 200B may provide a history for the usage amount of energy (the usage amount of energy for each time/date) at the user terminal apparatus 200B through the data of the electronic apparatus 200A received through the server apparatus 100.

For providing such a service, the server apparatus 100 may receive the data of the electronic apparatus 200A from the electronic apparatus 200A.

The server apparatus 100 may set the transmission condition of the electronic apparatus 200A for reducing the network traffic. Specifically, the server apparatus 100 may determine the transmission condition of data based on a service requested from the user terminal apparatus 200B, and transmit a request for transmitting data according to the transmission condition to the electronic apparatus 200A. In this case, the electronic apparatus 200A may transmit or may not transmit data corresponding to the service to the server apparatus 100 depending on whether the received transmission condition is satisfied. Then, the server apparatus 100 may provide the service to a user based on the data received from the electronic apparatus 200A.

The transmission condition may include at least one of a time cycle or a time period.

According to an embodiment of the disclosure as described above, as transmission of data is performed only in case the data of the electronic apparatus 200A satisfies the transmission condition, indiscreet transmission of the data of the electronic apparatus 200A to the server apparatus 100 can be prevented, and occurrence of traffic according to transmission of data can be minimized.

Hereinafter, various embodiments of the disclosure will be described in more detail with reference to the accompanying drawings.

Figure 2A:
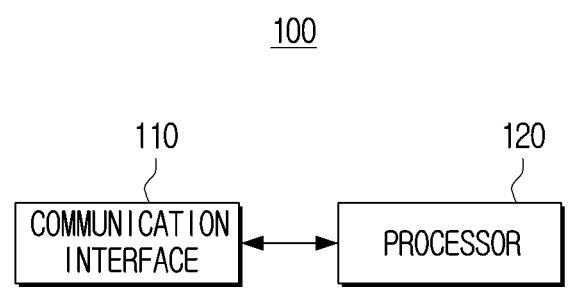
FIG. 2A is a block diagram of a server apparatus according to an embodiment of the disclosure.

FIG. 2A is a block diagram of a server apparatus according to an embodiment of the disclosure.

Figure 2B:
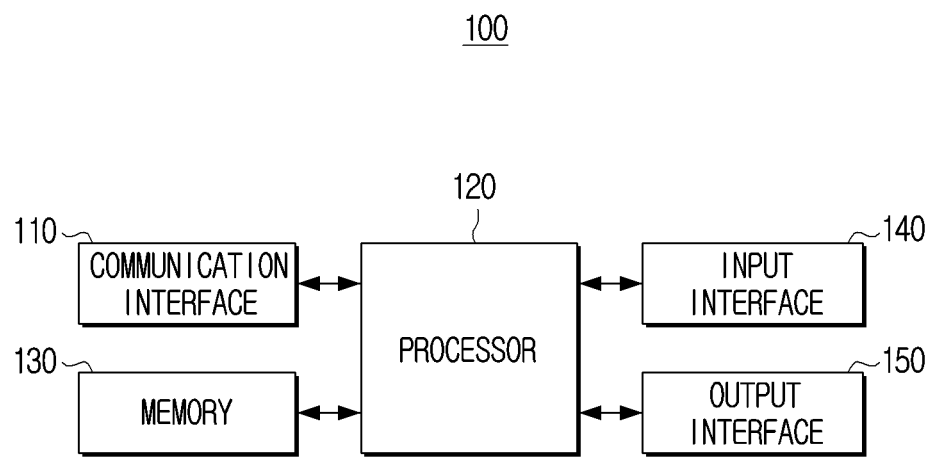
FIG. 2B is a block diagram for illustrating additional components of a server apparatus according to an embodiment of the disclosure.

FIG. 2B is a block diagram for illustrating additional components of a server apparatus according to an embodiment of the disclosure.

Referring to FIG. 2A, the server apparatus 100 according to an embodiment of the disclosure may include a communication interface 110 and a processor 120.

The communication interface 110 may be connected with another external apparatus via a network through various communication methods. Accordingly, the communication interface 110 may transmit and receive various data from another external apparatus.

For example, the communication interface 110 may receive a request of a service from an application executed in the user terminal apparatus 200B. Also, the communication interface 110 may transmit a request for transmitting data according to the transmission condition to the electronic apparatus 200A. Then, the communication interface 110 may receive data from the electronic apparatus 200A.

If a request of a service is received from an application executed at the user terminal apparatus 200B through the communication interface 110, the processor 120 may determine data corresponding to the request and the electronic apparatus 200A for receiving the data among the plurality of electronic apparatuses, determine a time cycle for receiving the data from the electronic apparatus 200A based on the service, control the communication interface 110 to transmit a request for transmitting the data according to the time cycle to the electronic apparatus 200A, and when the data is received from the electronic apparatus 200A at an interval of the time cycle through the communication interface 110, in response to the request for transmission, the processor 120 may provide the service based on the received data.

Specifically, if a request of a service is received from an application executed at the user terminal apparatus 200B through the communication interface 110, the processor 120 may determine data corresponding to the request and the electronic apparatus 200A for receiving the data among the plurality of electronic apparatuses. The application may refer to an assembly of instructions for providing specific services by using and applying the user terminal apparatus 200B. For example, the application may be implemented as SmartThings, etc.

The processor 120 may identify the types of data necessary for performing a service according to a request of a service (data required for performing a service), and identify an electronic apparatus that can provide the identified type of data among the plurality of electronic apparatuses constituting the IoT.

The data may include at least one of data for the state of the electronic apparatus 200A acquired from the electronic apparatus 200A or data for the surrounding environment acquired from the electronic apparatus 200A. That is, the type of the data is data for a state, and it may include at least one of information on the state of the power (e.g.: a Power On state, a Power Off state, the remaining amount of the battery, etc.), the degree of progress of the operation that is currently being performed, the kind of the operation that is currently being performed (e.g.: a moving operation, an air purifying operation, a cleaning operation, etc.), whether an operation is currently being performed (e.g.: an operation is being performed, a stand-by state, etc.), the state of network connection (e.g.: an Online state, an Offline state), the kind of the device (e.g.: a robot cleaner, an air conditioning device, a refrigerator, a door sensor, a TV, etc.), or hardware components. Also, the type of the data is data for the surrounding environment, and it may include at least one of information on the concentration of fine dust (e.g.: PM10, PM2.5, PM1.0 units), the concentration of gas, the temperature, the humidity, the location of the electronic apparatus 200A, an image that photographed the surroundings, or whether the door is opened or closed.

Specifically, in case a request of a service of monitoring the indoor temperature is received, the processor 120 may identify that the type of data necessary for performing the service is the indoor temperature through a database wherein services and types of data necessary for performing the services are matched in advance and stored.

In this case, the processor 120 may identify an electronic apparatus that can measure the indoor temperature among the plurality of electronic apparatuses based on apparatus information of the plurality of electronic apparatuses registered to an account of a user. The apparatus information may include at least one of information on names of electronic apparatuses, model names, hardware components, etc.

Then, the processor 120 may determine a time cycle for receiving data from the electronic apparatus 200A based on the service.

The time cycle may include a time interval of transmitting the data acquired by the electronic apparatus to the server apparatus 100 again after transmitting the data acquired by the electronic apparatus to the server apparatus 100.

Figure 3:
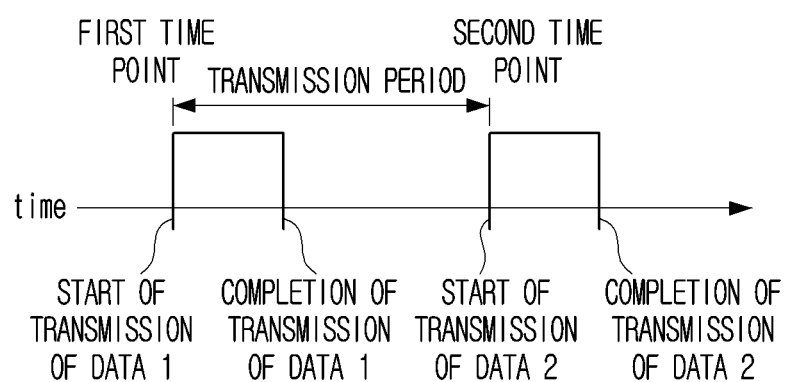
FIG. 3 is a diagram for illustrating a time cycle according to an embodiment of the disclosure.

FIG. 3 is a diagram for illustrating a time cycle according to an embodiment of the disclosure.

Referring to FIG. 3, the time cycle may include a time interval including a first time point when data is transmitted and a second time point when data is transmitted afterwards. That is, the time cycle may indicate a time interval at which transmission for the next data starts.

If a case wherein transmission of data 1 to the server apparatus 100 starts at the first time point is assumed, transmission of data 2 to the server apparatus 100 may start at the second time point. The second time point may indicate a time point that has passed as much as the time interval included in the time cycle from the first time point. Also, the data 1 may be data that was acquired most recently based on the first time point, and the data 2 may be data that was acquired most recently based on the second time point. For example, the data 2 may be data acquired after the data 1 was acquired, and it may indicate data of the same type as the data 1 (e.g.: the temperature).

Also, the electronic apparatus 200A may sequentially acquire data, and here, at least one data that was sequentially acquired after the data 1 may exist between the data 1 and the data 2. In this case, transmission of the data that exists between the data 1 and the data 2 may be omitted according to the time interval included in the time cycle.

According to an embodiment of the disclosure, the processor 120 may determine the time cycle according to a type of a service. As another example, the processor 120 may determine the time cycle according to the type of data required for performing a service.

Meanwhile, according to an embodiment of the disclosure, the processor 120 may determine the time cycle based on the number of times that a service was requested which was received through the communication interface 110 during a predetermined period.

For example, the processor 120 may determine the time cycle such that the time cycle becomes shorter as the number of times that a service was requested is relatively more. Also, the processor 120 may determine the time cycle such that the time cycle becomes longer as the number of times that a service was requested is relatively fewer.

Meanwhile, according to an embodiment of the disclosure, the processor 120 may determine the time cycle based on at least one of the format of the data corresponding to a request of a service received through the communication interface 110 or the size of the data. The format of the data may include formats such as a text (characters or numbers, etc.), an image, a moving image, a voice, etc.

For example, in case the format of the data is a text or an image, the processor 120 may determine the time cycle such that the time cycle becomes shorter. Also, in case the format of the data is a moving image or a voice, the processor 120 may determine the time cycle such that the time interval becomes longer.

As another example, the processor 120 may determine the time cycle such that the time interval becomes shorter as the size of the data is relatively smaller. Also, the processor 120 may determine the time cycle such that the time cycle becomes longer as the size of the data is relatively bigger.

Meanwhile, a time cycle according to an embodiment of the disclosure may be predetermined according to a service. For example, the time cycle may be matched with a service and stored in a database.

In case the requested service is a first service, the processor 120 may determine that the time cycle by which the electronic apparatus 200A will transmit data to the server apparatus 100 is a first time cycle. Also, in case the requested service is a second service, the processor 120 may determine that the time cycle by which the electronic apparatus 200A will transmit data to the server apparatus 100 is a second time cycle longer than the first time cycle.

As an example, the first service and the second service may be services of different types from each other. For example, the first service may be an automation service of performing an air purifying operation according to the concentration of fine dust, and the second service may be a monitoring service of monitoring the usage amount of energy.

As another example, the first service and the second service may be services using data of different types from each other. For example, the first service may be a monitoring service of collecting data for the usage amount of energy, and the second service may be a monitoring service of collecting data for the concentration of fine dust.

Then, the processor 120 may control the communication interface 110 to transmit a request for transmitting data according to the time cycle to the electronic apparatus 200A.

When a request for transmitting data is received, the electronic apparatus 200A may transmit the data acquired by the electronic apparatus to the server apparatus 100, and transmit the data acquired by the electronic apparatus 200A to the server apparatus 100 at a time point that passed the time cycle.

Specifically, when a request for transmitting the data according to the time cycle is received, the electronic apparatus 200A may store information on the time cycle. Then, the electronic apparatus 200A may transmit the data to the server apparatus 100 based on the time cycle.

For example, the electronic apparatus 200A may transmit the data 1 that was acquired most recently based on the current first time point to the server apparatus 100. Then, the electronic apparatus 200A may not transmit data until the time interval included in the time cycle passes from the first time point. Then, in case the second time point that passed the time interval included in the time cycle from the first time point is reached, the electronic apparatus 200A may transmit the data 2 that was acquired most recently based on the second time point to the server apparatus 100.

Then, when the data is received by an interval of the time cycle from the electronic apparatus 200A through the communication interface 110, in response to the request for transmission, the processor 120 may provide the service based on the received data.

Meanwhile, if information indicating that provision of a service was completed, or execution of an application was finished is received from the user terminal apparatus 200B through the communication interface 110, the processor 120 according to an embodiment of the disclosure may control the communication interface 110 to transmit a request for stopping transmission of the data to the electronic apparatus 200A.

Specifically, completion of provision of a service may refer to a case wherein a service using the data of the electronic apparatus 200A was performed at the user terminal apparatus 200B (e.g.: a case wherein an operation was executed according to satisfying a condition in an automation service, etc.). In this case, the processor 120 may receive information indicating that provision of a service was completed from the user terminal apparatus 200B through the communication interface 110.

Meanwhile, finishing of execution of an application may refer to a case wherein an application for performing a service is finished at the user terminal apparatus 200, and in this case, the processor 120 may receive information indicating that execution of an application was finished from the user terminal apparatus 200 through the communication interface 110.

The processor 120 may control the communication interface 110 to transmit a request for stopping transmission of data to the electronic apparatus 200A. In this case, the electronic apparatus 200A may stop transmission of data to the server apparatus 100 according to the received request for stopping transmission.

Meanwhile, if information indicating that provision of a service was completed, or execution of an application was finished is received from the user terminal apparatus 200B through the communication interface 110, the processor 120 according to an embodiment of the disclosure may increase the time interval of the time cycle.

In this case, the processor 120 may change the time cycle such that the time interval is increased, and control the communication interface 110 to transmit information on transmission of data according to the changed time cycle to the electronic apparatus 200A. Then, the electronic apparatus 200A may transmit data to the server apparatus 100 according to the received time cycle.

Meanwhile, the processor 120 according to an embodiment of the disclosure may determine a transmission period for receiving data from the electronic apparatus 200A based on a service.

Figure 4:
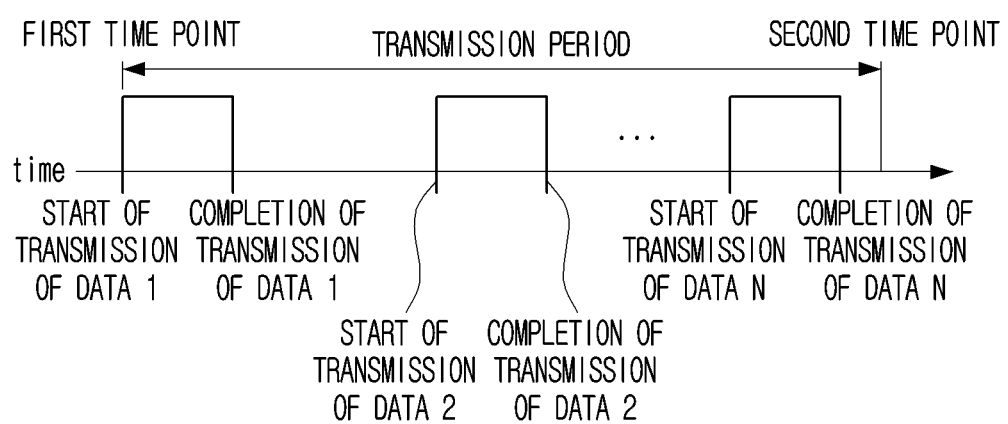
FIG. 4 is a diagram for illustrating a transmission period according to an embodiment of the disclosure.

FIG. 4 is a diagram for illustrating a transmission period according to an embodiment of the disclosure.

Referring to FIG. 4, the transmission period may include the time interval from the first time point to the second time point. The first time point may be time when transmission of data starts, and the second time point may indicate time when transmission of data is stopped. The transmission period may be set according to a user command by a user, or set as a predetermined value by the manufacturer.

As an example, the processor 120 may determine the transmission period of data based on the number of times that a service was requested which was received through the communication interface 110 during a predetermined time period. For example, the processor 120 may determine the transmission period such that the transmission period becomes longer as the number of times that a service was requested is relatively more. Also, the processor 120 may determine the transmission period such that the transmission period becomes shorter as the number of times that a service was requested is relatively fewer.

In this case, the processor 120 may control the communication interface 110 to transmit a request for transmitting data according to the transmission period to the electronic apparatus 200A. Then, when the request for transmitting data according to the transmission period is received, the electronic apparatus 200A may store information on the transmission period. Then, the electronic apparatus 200A may transmit the data to the server apparatus 100 based on the transmission period.

For example, the electronic apparatus 200A may transmit data sequentially acquired to the server apparatus 100 during the time until the second time point which is after the time interval of the transmission period based on the first time point which is the current time. Then, in case the second time point passed, the electronic apparatus 200A may stop transmission of the data to the server apparatus 100.

Meanwhile, it was described that the aforementioned time cycle and transmission period are independent from each other, but it is only for the convenience of explanation, and the disclosure can obviously be implemented by combining them.

The server apparatus 100 according to an embodiment of the disclosure as above may change transmission of data by the electronic apparatus 200A from a connectivity base of the electronic apparatus 200A to a request base of the client (a server, a service, a user, etc.), and thereby minimize waste of data, and at the same time, provide a seamless IoT experience to a user.

Referring to FIG. 2B, the server apparatus 100 according to an embodiment of the disclosure may further include at least one of a memory 130, an input interface 140, or an output interface 150, other than the communication interface 110 and the processor 120.

The communication interface 110 may refer to hardware that can transmit and receive various information (or data) by performing communication in a wired communication method or a wireless communication method with various server apparatuses 100. In this case, the communication interface 110 may transmit and receive various information to and from the various server apparatuses 100 by using communication protocols such as a Transmission Control Protocol/an Internet Protocol (TCP/IP), a User Datagram Protocol (UDP), a Hyper Text Transfer Protocol (HTTP), a Secure Hyper Text Transfer Protocol (HTTPS), a File Transfer Protocol (FTP), a Secure File Transfer Protocol (SFTP), a Message Queuing Telemetry Transport (MQTT), etc.

Wireless communication may include at least one of communication methods such as long-term evolution (LTE), LTE Advance (LTE-A), 5th Generation (5G) mobile communication, code division multiple access (CDMA), wide-band CDMA (WCDMA), a universal mobile telecommunications system (UMTS), Wireless Broadband (WiBro), a Global System for Mobile Communications (GSM), Time Division Multiple Access (DMmobilA), Wi-Fi (WiFi), WiFi Direct, Bluetooth, near field communication (NFC), Zigbee, etc. Meanwhile, wired communication may include at least one of communication methods such as an Ethernet, an optical network, a Universal Serial Bus (USB), a Thunder-Bolt, etc.

For this, the communication interface 110 may include a network interface module such as a WiFi module, a Bluetooth module, a wireless communication module, an NFC module, etc. that performs communication with an external apparatus according to the aforementioned wired and wireless communication methods, and a network interface controller (NIC) that controls a network interface. Meanwhile, the communication methods according to the disclosure are not limited to the aforementioned examples, and may include communication methods that newly appear according to the development of technologies.

The processor 120 may control the overall operations of the server apparatus 100. The processor 120 may consist of one or a plurality of processors, and it may be implemented as, for example, a generic-purpose processor such as a central processing unit (CPU), an application processor (AP), etc., a graphic-dedicated processor such as a graphic processing unit (GPU), a vision processing unit (VPU), etc., an artificial intelligence-dedicated processor such as a neural processing unit (NPU), etc.

In the memory 130, instructions or programs executed by the processor 120 may be stored. Also, in the memory 130, information or data received through the communication interface 110 may be stored. For example, in the memory 130, various request instructions of a user received from the user terminal apparatus 200B and various data received from the user apparatus 200A may be stored.

The memory 130 may be accessed by the processor 120, and reading/recording/correction/deletion/update, etc. for an instruction, a module, an artificial intelligence model, or data may be performed by the processor 120.

The input interface 140 may receive various user inputs and transmit them to the processor 120. The input interface may include, for example, at least one of a touch panel (not shown), a pen sensor (not shown), a key (not shown), or a microphone (not shown). A touch panel may use, for example, at least one method among a capacitive method, a decompressive method, an infrared method, and an ultrasonic method, and for this, the touch panel may include a control circuit. The touch panel may further include a tactile layer, and provide a tactile response to a user. A pen sensor may be, for example, a part of a touch panel, or include a separate sheet for recognition. A key may include, for example, a physical button, an optical key, or a keypad. The input interface as described above may be housed inside the electronic apparatus 200A like a built-in keyboard, a track pad, a button, a touch panel, etc., or implemented as a separate external apparatus (not shown) such as an external keyboard, a mouse, etc.

The output interface 150 may include at least one of a display (not shown) or a speaker (not shown). The display is an apparatus that outputs information in a visual form (e.g.: characters, images, etc.). The display may display an image frame in the entire or partial area of a display area. The display area may refer to the entire area in pixel units wherein information or data is visually displayed. At least a part of the display may be combined with at least one of the front surface area, the side surface area, or the rear surface area of the electronic apparatus 200A in the form of a flexible display. The flexible display may be characterized in that it can be curved, bent, or rolled without damage through a substrate which is thin and flexible like paper. The speaker is an apparatus that outputs information in an auditory form (e.g.: a voice). The speaker may output not only various kinds of audio data for which various processing jobs such as decoding or amplification, noise filtering, etc. were performed by an audio processor (not shown), but also various kinds of notification sounds or voice messages directly as sounds.

Figure 5:
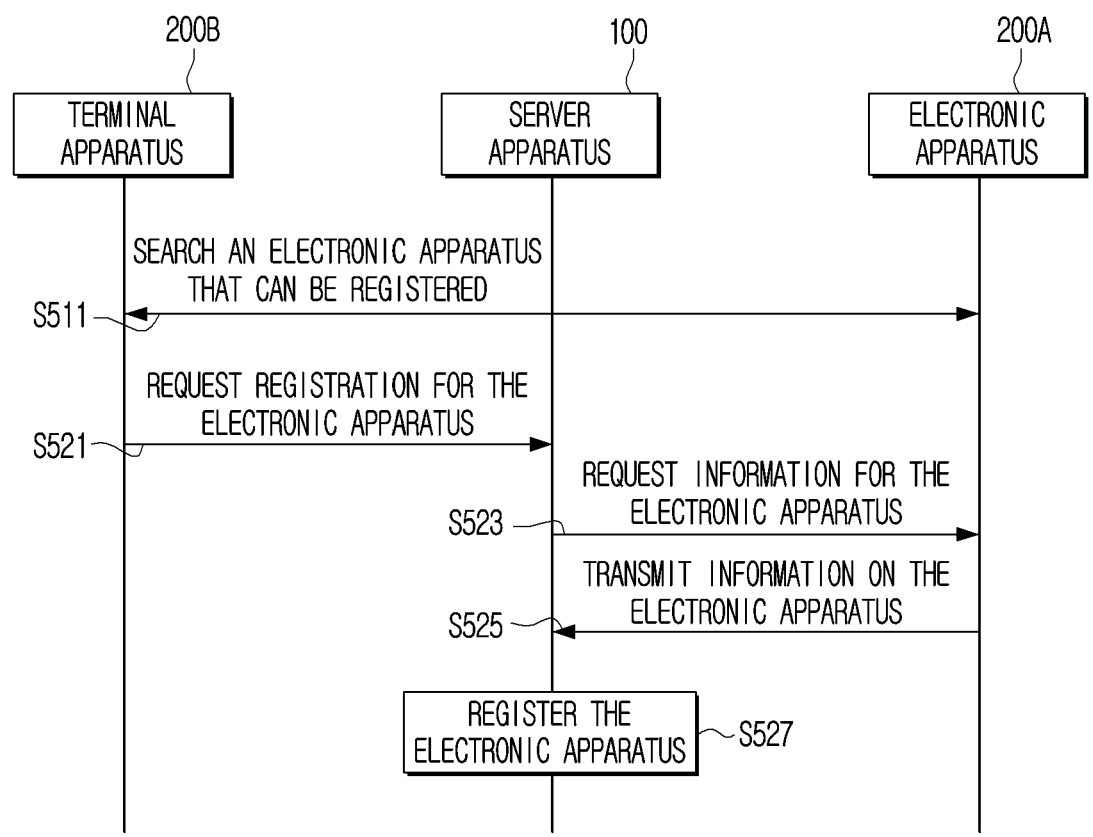
FIG. 5 is a diagram for illustrating a process wherein an electronic apparatus is registered according to an embodiment of the disclosure.

FIG. 5 is a diagram for illustrating a process wherein an electronic apparatus is registered according to an embodiment of the disclosure.

Referring to FIG. 5, the electronic apparatus 200A according to an embodiment of the disclosure may be registered to the server apparatus 100. Hereinafter, the process wherein the electronic apparatus 200A is registered to the server apparatus 100 will be described based on the assumption of a state before the electronic apparatus 200A is registered to the server apparatus 100.

First, if a user command for registering the electronic apparatus 200A to the server apparatus 100 is received from an application executed at the user terminal apparatus 200B, the user terminal apparatus 200B may search an electronic apparatus that can be registered in a network (e.g.: a WiFi network environment) at operation S511.

A user command received at the user terminal apparatus 200B may be implemented as various types of user instructions such as a touch gesture, a motion gesture, a user voice, an input through an input interface like a mouse or a keyboard, etc. For this, the user terminal apparatus 200B may include an apparatus that can receive the aforementioned types of user instructions, i.e., at least one of a touch display panel, a camera, a microphone, etc.

Also, the user terminal apparatus 200B may transmit a signal that searches at least one electronic apparatus inside the network by using various types of network protocols, and may receive information for an electronic apparatus from at least one electronic apparatus in response thereto. Meanwhile, this is merely an example, and it is also possible to search an electronic apparatus through the server apparatus 100.

Then, when information on an electronic apparatus is received, the user terminal apparatus 200B may output a list of electronic apparatuses corresponding to the received information. For example, the user terminal apparatus 200B may display a list of electronic apparatuses on the display as a text or an image, or display a list of electronic apparatuses as a voice through the speaker.

In this case, if a user command for selecting the electronic apparatus 200A is received from the output list, the user terminal apparatus 200B may transmit a request for registration for the selected electronic apparatus 200A to the server apparatus 100 at operation S521.

Then, when the request for registration for the electronic apparatus 200A is received from the user terminal apparatus 200B, the server apparatus 100 may transmit a request for information on the state of the electronic apparatus 200A to the electronic apparatus 200A at operation S523.

As a response thereto, the electronic apparatus 200A may transmit information on the apparatus of the electronic apparatus 200A to the server apparatus 100 at operation S525. The information on the apparatus of the electronic apparatus 200A may include unique identifiers (e.g.: the name, the model, the serial number, the Mac address, etc.) that were given so that the electronic apparatus 200A can be identified. Also, the information on the apparatus of the electronic apparatus 200A may further include information on at least one of the hardware components, the software components, the firmware/OS version, etc. As described above, the information on the apparatus of the electronic apparatus 200A may include information necessary for network connection.

In this case, the server apparatus 100 may register the electronic apparatus 200A based on the received information on the apparatus of the electronic apparatus 200A at operation S527. Specifically, the server apparatus 100 may register the electronic apparatus 200A as an electronic apparatus constituting an IoT to the database of the server apparatus 100 based on the received information on the apparatus of the electronic apparatus 200A, and store the information of the electronic apparatus 200A.

The state wherein the electronic apparatus 200A is registered to the server apparatus 100 may be referred to as an online state, and this may indicate a state wherein transmission and reception of data become possible between the server apparatus 100 and the electronic apparatus 200A. The server apparatus 100 may receive data for performing a specific service from the electronic apparatus 200A after the electronic apparatus 200A is registered.

Figure 6:
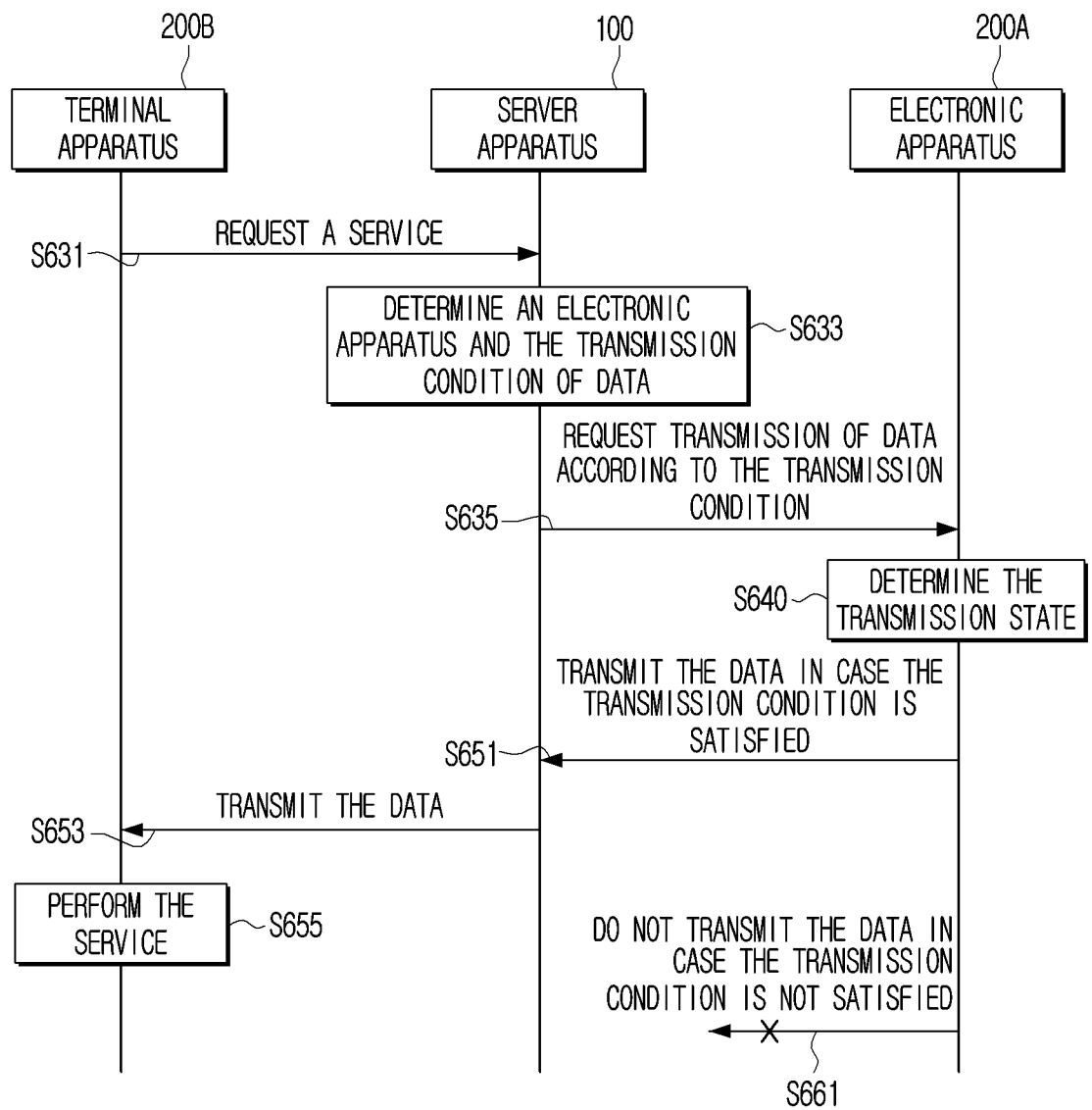
FIG. 6 is a diagram for illustrating a process of performing a service according to an embodiment of the disclosure.

FIG. 6 is a diagram for illustrating a process of performing a service according to an embodiment of the disclosure.

Referring to FIG. 6, if a user command for performing a service is received from an application executed at the user terminal apparatus 200B, the user terminal apparatus 200B may transmit a request for the service to the server apparatus 100 at operation S631.

In this case, the server apparatus 100 may determine data corresponding to the request and the electronic apparatus 200A for receiving data among a plurality of electronic apparatuses, and determine a transmission condition (e.g.: the time cycle or the transmission period) for receiving data from the electronic apparatus 200A based on the service at operation S633.

Then, the server apparatus 100 may transmit a request for transmitting data according to the transmission condition to the electronic apparatus 200A at operation S635.

In this case, the electronic apparatus 200A may determine the transmission state based on the received transmission condition at operation S640. The electronic apparatus 200A may determine the transmission state as an on state in case the transmission condition is satisfied, and determine the transmission state as an off state in case the transmission condition is not satisfied.

For example, in case the electronic apparatus 200A determined the transmission state as an on state at the first time point, the electronic apparatus 200A may determine the transmission state as an off state after the first time point is passed, and determine the transmission state as an on state at a time point after the time interval included in the time cycle from the first time point. As described above, the electronic apparatus 200A may repeatedly change the transmission state to an on state and an off state according to the time cycle. As another example, in case the current time is not past the transmission period, the electronic apparatus 200A may determine the transmission state as an on state, and in case the current time is past the transmission period, the electronic apparatus 200A may determine the transmission state as an off state.

In case the transmission condition is satisfied (e.g.: in case the transmission state for data is an on state), the electronic apparatus 200A may operate to transmit data to the server apparatus 100 at operation S651. In this case, the server apparatus 100 may transmit the data received from the electronic apparatus 200A to the user terminal apparatus 200B at operation S653. Then, the user terminal apparatus 200B may perform the service by using the data of the electronic apparatus 200A received from the server apparatus 100 at operation S655.

Unlike the above, in case the transmission condition is not satisfied (in case the transmission state for data is an off state), the electronic apparatus 200A may operate not to transmit data to the server apparatus 100 at operation S661.

Figure 7A:
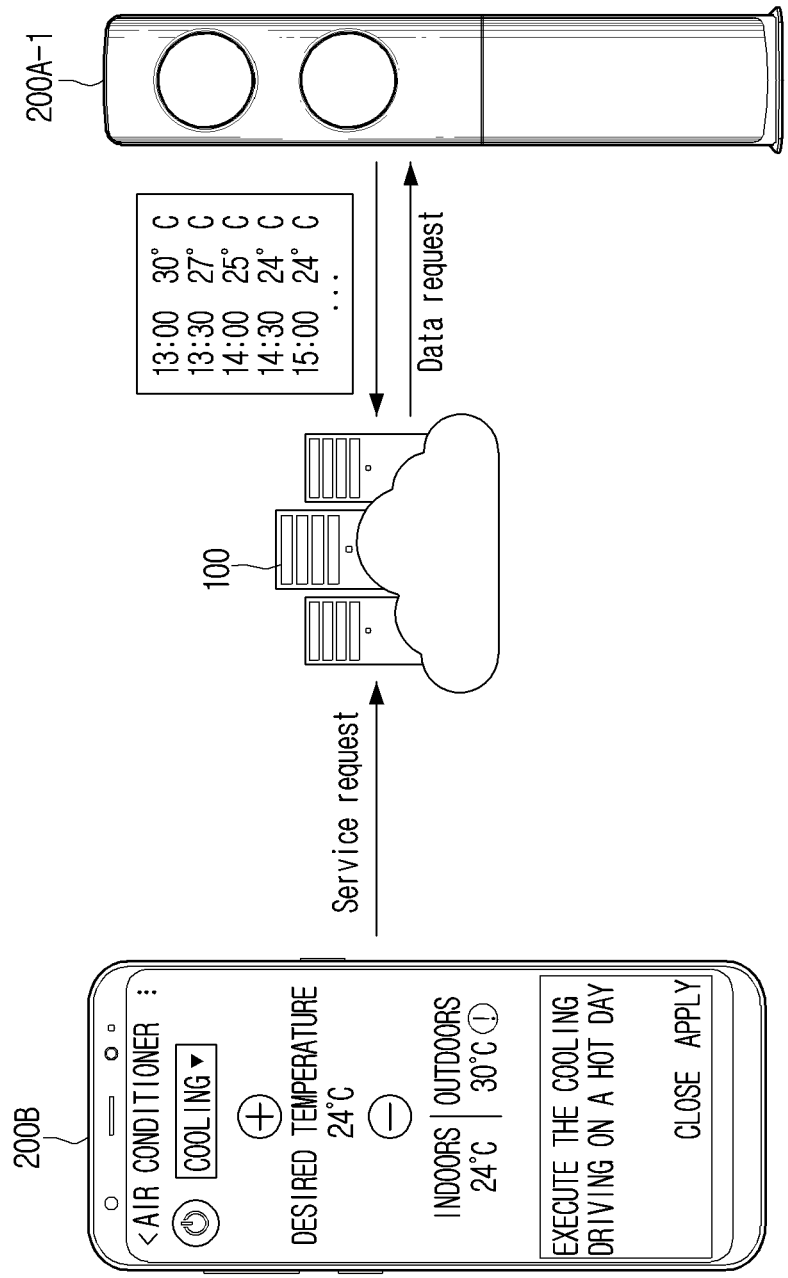
FIG. 7A is a diagram for illustrating a time cycle according to an embodiment of the disclosure.
Figure 7B:
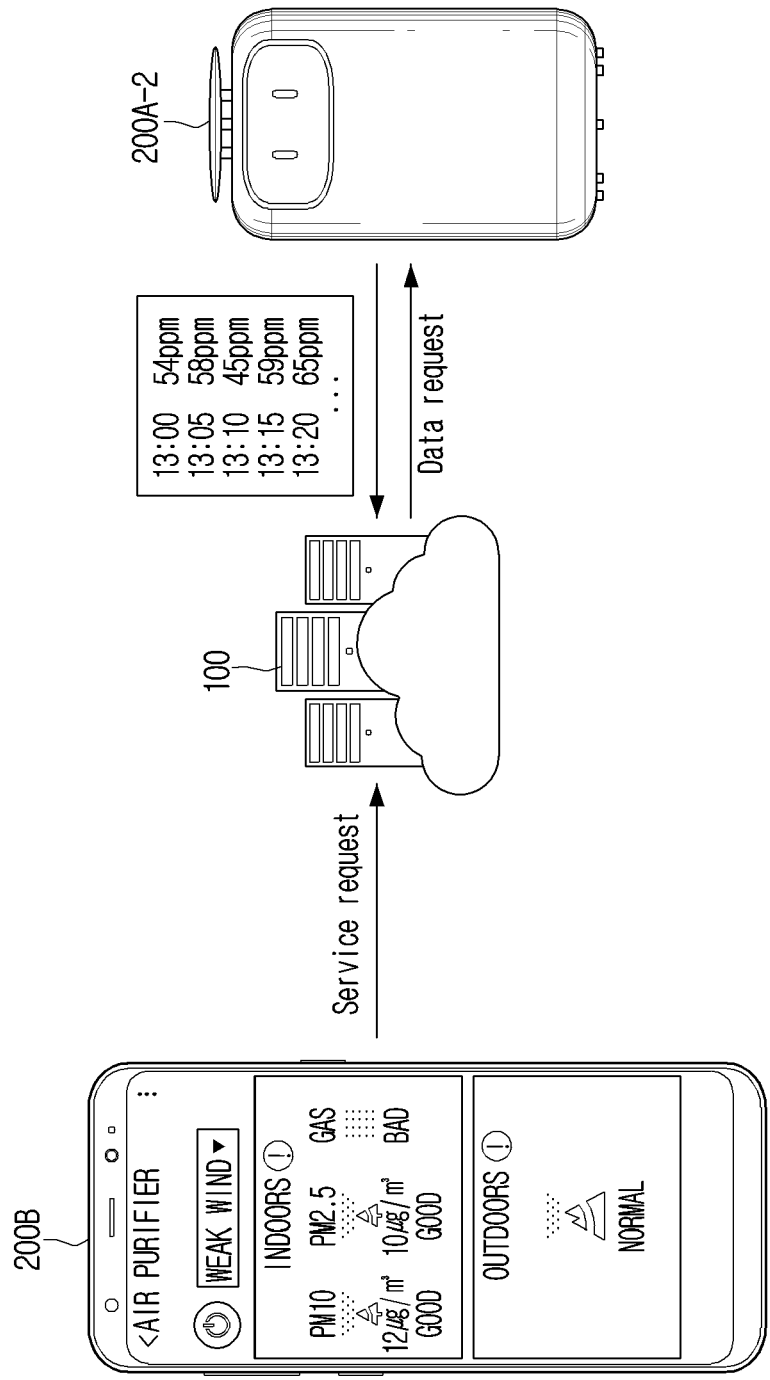
FIG. 7B is a diagram for illustrating a time cycle according to an embodiment of the disclosure.

FIGS. 7A and 7B are diagrams for illustrating a time cycle according to various embodiments of the disclosure.

Referring to FIGS. 7A and 7B, a case wherein the user terminal apparatus 200B performs a service through the electronic apparatuses 200A-1, 200A-2 will be described.

Referring to FIG. 7A, it will be assumed that the electronic apparatus 200A-1 is implemented as an air conditioner (or a temperature sensor apparatus, etc.) that can measure the indoor temperature, and referring to FIG. 7B, it will be assumed that the electronic apparatus 200A-2 is implemented as an air purifying apparatus that measures the concentration of fine dust or performs an air purifying operation.

Referring to FIGS. 7A and 7B, the user terminal apparatus 200B may execute an application for performing services related to the electronic apparatuses 200A-1, 200A-2 (e.g.: SmartThings, etc.) according to a received user command (e.g.: a touch input, a user voice, etc.).

Referring to FIG. 7A, it will be assumed that a service related to the electronic apparatus 200A-1 is a monitoring service for the indoor temperature.

Referring to FIG. 7B, it will be assumed that a service related to the electronic apparatus 200A-2 is an automation service of performing an air purifying operation according to the concentration of fine dust.

In this case, the user terminal apparatus 200B may transmit a request for a service according to an executed application to the server apparatus 100.

Then, when the request for a service is received from the user terminal apparatus 200B, the server apparatus 100 may determine data corresponding to the request for a service, and may determine that the electronic apparatuses for receiving data (the electronic apparatuses that can acquire data) among the plurality of electronic apparatuses registered to the server apparatus 100 are the electronic apparatuses 200A-1, 200A-2.

For example, referring to FIG. 7A, if a request for a monitoring service for the indoor temperature is received from the user terminal apparatus 200B, the server apparatus 100 may determine that data corresponding to the request for the service is the indoor temperature, and determine that the electronic apparatus for receiving the indoor temperature (the electronic apparatus that includes a sensor that can acquire the indoor temperature) among the plurality of electronic apparatuses registered to the server apparatus 100 is the electronic apparatus 200A-1.

As another example, referring to FIG. 7B, if a request for an automation service of performing an air purifying operation according to the concentration of fine dust is received from the user terminal apparatus 200B, the server apparatus 100 may determine that data corresponding to the request for the service is the concentration of fine dust, and determine that the electronic apparatus for receiving the concentration of fine dust (the electronic apparatus that includes a sensor that can acquire the concentration of fine dust) among the plurality of electronic apparatuses registered to the server apparatus 100 is the electronic apparatus 200A-2.

In this case, the server apparatus 100 may determine the time cycle for receiving data for the indoor temperature from the electronic apparatus 200A-1 based on the service.

In case the degree that the data required for performing a service is changed is small, the server apparatus 100 may determine that a relatively long time cycle is included. However, this is merely an example, and the server apparatus 100 may determine the time cycle according to the type of a service or the type of data required for performing a service.

For example, referring to FIG. 7A, in the case of a monitoring service for the indoor temperature, the server apparatus 100 may determine the time cycle as 30 minutes.

As another example, referring to FIG. 7B, in the case of an automation service of performing an air purifying operation according to the concentration of fine dust, the server apparatus 100 may determine the time cycle as five minutes.

Then, referring to FIGS. 7A and 7B, the server apparatus 100 may transmit a request for transmitting data (e.g.: the indoor temperature in the case of FIG. 7A, the concentration of fine dust referring to FIG. 7B) according to the time cycle (e.g.: 30 minutes in the case of FIG. 7A, 5 minutes referring to FIG. 7B) to the electronic apparatuses 200A-1 and 200A-2. Then, the server apparatus 100 may receive data corresponding to the time cycle among the plurality of data sequentially acquired from the electronic apparatuses 200A-1 and 200A-2 at an interval of the time cycle.

In this case, referring to FIG. 7A, the server apparatus 100 may transmit data received from the electronic apparatus 200A-1 (e.g.: the indoor temperature) to the user terminal apparatus 200B. As an example, the server apparatus 100 may transmit received data to the user terminal apparatus 200B whenever data is received from the electronic apparatus 200A-1. Unlike this, the server apparatus 100 may store data received from the electronic apparatus 200A-1, and transmit the plurality of stored data to the user terminal apparatus 200B only when a request for data is received from the user terminal apparatus 200B.

Then, the user terminal apparatus 200B may provide a monitoring service for the indoor temperature to the user by displaying the received data (e.g.: the indoor temperature for each time) on the display.

Meanwhile, as a different case from this, referring to FIG. 7B, the server apparatus 100 may provide an automation service of performing an air purifying operation according to the concentration of fine dust based on the data received from the electronic apparatus 200A-2 (e.g.: the concentration of fine dust).

For example, the server apparatus 100 may determine whether the data received from the electronic apparatus 200A-2 (e.g.: the concentration of fine dust) exceeds a predetermined reference value (e.g.: 75 μm/m² at PM 2.5, etc.), and in case the concentration value of fine dust exceeds a predetermined reference value, the server apparatus 100 may transmit a command for requesting to perform an air purifying operation to the electronic apparatus 200A-2. When the command for requesting to perform an air purifying operation is received from the server apparatus 100, the electronic apparatus 200A-2 may perform an air purifying operation.

Figure 8A:
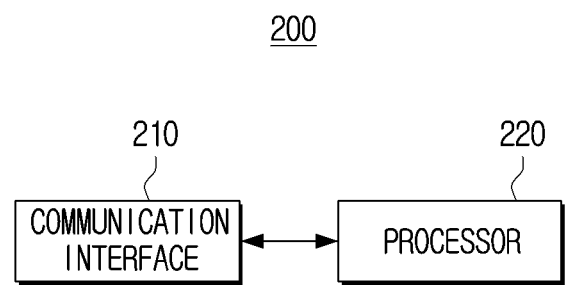
FIG. 8A is a block diagram of an electronic apparatus according to an embodiment of the disclosure.

FIG. 8A is a block diagram of an electronic apparatus according to an embodiment of the disclosure.

Figure 8B:
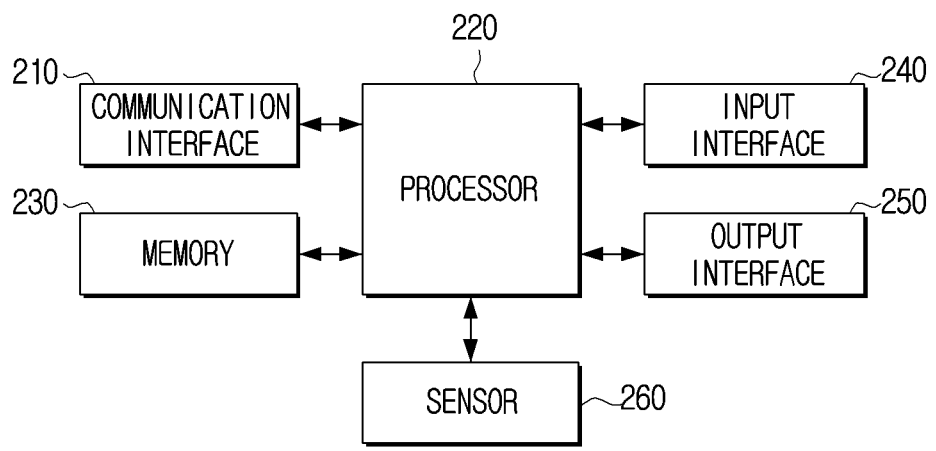
FIG. 8B is a block diagram for illustrating additional components of an electronic apparatus according to an embodiment of the disclosure.

FIG. 8B is a block diagram for illustrating additional components of an electronic apparatus according to an embodiment of the disclosure.

Referring to FIG. 8A, the electronic apparatus 200 according to an embodiment of the disclosure may include a communication interface 210 and a processor 220. The electronic apparatus 200 may be at least one of the electronic apparatus 200A constituting an IoT or the user terminal apparatus 200B.

The communication interface 210 may be connected to another external apparatus via a network through communication by various methods. Accordingly, the communication interface 210 may transmit and receive various data from another external apparatus.

The communication interface 210 may receive a request for transmitting data according to the transmission condition from the server apparatus 100. The transmission condition may include at least one of the time cycle or the transmission period. Also, the transmission condition may be stored in the memory 230 (refer to FIG. 8B).

Meanwhile, the communication interface 210 according to an embodiment of the disclosure may perform an operation of receiving data from the server apparatus 100 regardless of the transmission state. That is, the communication interface 210 may receive data from the server apparatus 100 in case the transmission state is an off state.

The processor 220 may control the overall operations of the electronic apparatus 200. That is, the processor 220 may control the overall operations of each component of the electronic apparatus 200.

If a request for transmitting data according to the transmission condition is received from the server apparatus 100 through the communication interface 210, the processor 220 may determine data corresponding to the request for transmission.

Also, if a request for transmitting data according to the transmission condition is received from the server apparatus 100 through the communication interface 210, the processor 220 may determine the transmission state of data according to the transmission condition.

For example, if a request for transmitting data according to the transmission condition is received from the server apparatus 100 through the communication interface 210, the processor 220 may identify the type of requested data according to the requisition for transmission, and determine the transmission state of data according to the transmission condition.

The type of data may refer to the type for identifying data transmitted to the server apparatus 100. For example, the type of data may be the concentration of fine dust (e.g.: PM10, PM2.5, PM1.0, etc.) acquired by a sensor 260 (refer to FIG. 8B), the rotating speed of the fan, the indoor temperature, the indoor humidity, the state of the filter (e.g.: the usable remaining amount of the filter), information on an operation performed by the electronic apparatus 200, a completion rate of an operation (e.g.: a percentage unit), the time when an operation proceeded, the time when an operation started, the time when an operation is expected to be completed, the power state of the device (e.g.: a power on state, a power off state, a standby mode state, the remaining amount of the battery, whether power is supplied, etc.), and the like.

The processor 220 may control the communication interface 210 to transmit data to the server apparatus 100 according to the transmission state. The transmission state may be one of an on state wherein transmission of data for the server apparatus 100 continues or an off state wherein transmission of data is stopped.

For example, in case the transmission state is an on state, the processor 220 may control the communication interface 210 to transmit data to the server apparatus 100. Unlike this, in case the transmission state is an off state, the processor 220 may control the communication interface 210 not to transmit data to the server apparatus 100.

As an example, the processor 220 may alternatingly change the transmission state of the communication interface 210 to an on state and an off state according to the time cycle.

For example, the processor 220 may control the communication interface 210 to start transmission of data for the server apparatus 100 at the first time point when the transmission state of the communication interface 210 is an on state, and change the transmission state of the communication interface 210 to an off state at the second time point when transmission of data for the server apparatus 100 is completed.

Then, the processor 220 may change the transmission state of the communication interface 210 to an on state at the third time point when the time interval included in the time cycle was passed from the first time point.

In this case, the processor 220 may control the communication interface 210 to start transmission of the next data for the server apparatus 100 at the third time point when the transmission state of the communication interface 210 is an on state, and change the transmission state of the communication interface 210 to an off state at the fourth time point when transmission of the next data for the server apparatus 100 is completed.

As described above, the processor 220 may repeatedly change the transmission state of the communication interface 210 to an on state and an off state according to the time cycle.

As another example, according to the transmission period included in the transmission condition, in case the current time is within the transmission period, the processor 220 may determine the transmission state of the communication interface 210 as an on state. Meanwhile, in case the current time is after the transmission period, the processor 220 may determine the transmission state of the communication interface 210 as an off state.

For example, in case the current time is within the transmission period, i.e., in case the transmission period was not expired, the processor 220 may determine the transmission state of the communication interface 210 as an on state. Also, in case the current time is after the transmission period, i.e., in case the transmission period was expired, the processor 220 may change the transmission state of the communication interface 210 to an off state.

As still another example, if a case wherein the time cycle and the transmission period are included in the transmission condition is assumed, the processor 220 may determine the transmission state of the communication interface 210 by applying the time cycle within the transmission period. For example, in case the current time is within the transmission period, the processor 220 may alternatingly change the transmission state of the communication interface 210 to an on state and an off state according to the time cycle. Also, in case the current time is after the transmission period, the processor 220 may determine the transmission state of the communication interface 210 as an off state regardless of the time cycle.

Meanwhile, according to an embodiment of the disclosure, if the network connection with the server apparatus 100 is disconnected when the transmission state of the electronic apparatus 200 is an on state, and the network connection with the server apparatus 100 is resumed afterwards, the processor 220 may determine the transmission state while excluding the period between the time point when the network connection was disconnected and the time point when the network connection was resumed in the transmission period.

Accordingly, a phenomenon wherein the transmission period of data is substantially reduced due to disconnection of the network connection because of a network failure, etc. is prevented, and the transmission state of the electronic apparatus 200 is maintained as an on state, and thus there is an effect that the amount of data transmitted from the electronic apparatus 200 to the serve apparatus 100 is maintained as higher than or equal to a specific level.

As described above, the electronic apparatus 200 according to an embodiment of the disclosure can prevent indiscreet transmission of the data of the electronic apparatus 200 to an external apparatus by limiting the types of data, the time cycle of data, and the transmission period of data transmitted to an external apparatus, and can minimize occurrence of traffic in accordance thereto. Also, the electronic apparatus 200 can reduce the server management cost of the manufacturer, and can provide an opportunity for reducing servers. Along with this, the electronic apparatus 200 can provide advanced home Internet of Things (IoT) experiences that are not changed from the past to a user.

Referring to FIG. 8B, the electronic apparatus 200 according to an embodiment of the disclosure may further include at least one of a memory 230, an input interface 240, an output interface 250, or a sensor 260, other than the communication interface 210 and the processor 220. Regarding the communication interface 210, the processor 220, the memory 230, the input interface 240, and the output interface 250, the aforementioned respective descriptions for the communication interface 110, the processor 120, the memory 130, the input interface 140, and the output interface 150 can be applied in a corresponding manner. Thus, overlapping contents will be omitted.

The sensor 260 may refer to a device that detects the amounts or the changes of various physical signals (e.g.: a temperature, a light, a sound, a chemical substance, electricity, magnetism, pressure, etc.). A detected signal may be converted to data in a format that can be interpreted by the processor 120 by the sensor 260 or the processor 220.

The sensor 260 may be implemented as various sensors such as a camera, a microphone, a proximity sensor, an illumination sensor, a temperature sensor, a humidity sensor, a motion sensor, a Time of Flight (ToF) sensor, a GPS sensor, etc.

For example, a camera may divide a light into pixel units, detect the strength of the light for red (R), green (G), and blue (B) colors for each pixel, convert the strength of the light into an electronic signal, and acquire data expressing the color, the shape, the contrast, etc. of the object. The type of the data may be an image having R, G, and B color values for each of a plurality of pixels. A microphone may detect a sound wave like a user's voice, convert the sound wave into an electronic signal, and acquire data. The type of the data may be audio signals in various formats. A proximity sensor may detect presence of an adjacent object, and acquire data regarding whether an adjacent object exists or whether an adjacent object is close. An illumination sensor may detect the light amount (or the brightness) regarding the surrounding environment of the electronic apparatus 200, and acquire data for the illumination. A temperature sensor may detect the temperature of a subject object or the temperature of the surrounding environment of the electronic apparatus 200 (e.g.: the indoor temperature, etc.) according to heat radiation (or photons). The temperature sensor may be implemented as an infrared camera, etc. A humidity sensor may detect the amount of vapor in the air through various methods such as change of colors due to a chemical reaction in the air, change of the ion amount, electromotive force, change of electric currents, etc., and acquire data for the humidity. A motion sensor may detect the moving distance, the moving direction, the tilting, etc. of the electronic apparatus 200. For this, the motion sensor may be implemented as a combination of an acceleration sensor, a gyro sensor, a geomagnetic sensor, etc. A Time of Flight (TOF)

sensor may detect the flight time during which various electromagnetic waves (e.g.: an ultrasonic wave, an infrared ray, a laser, etc.) having a specific speed return after they are emitted, and acquire data for the distance (or the location) with a subject. A Global Positioning System (GPS) sensor may receive radio signals from a plurality of satellites, respectively calculate the distance with each satellite by using the transmission time of the received signal, and acquire data for the current location of the electronic apparatus 200 by using triangulation with respect to the calculated distance.

Meanwhile, the aforementioned implementation examples of the sensor 260 are merely examples, and the sensor is not limited thereto, and can be implemented as various types of sensors.

Figure 9:
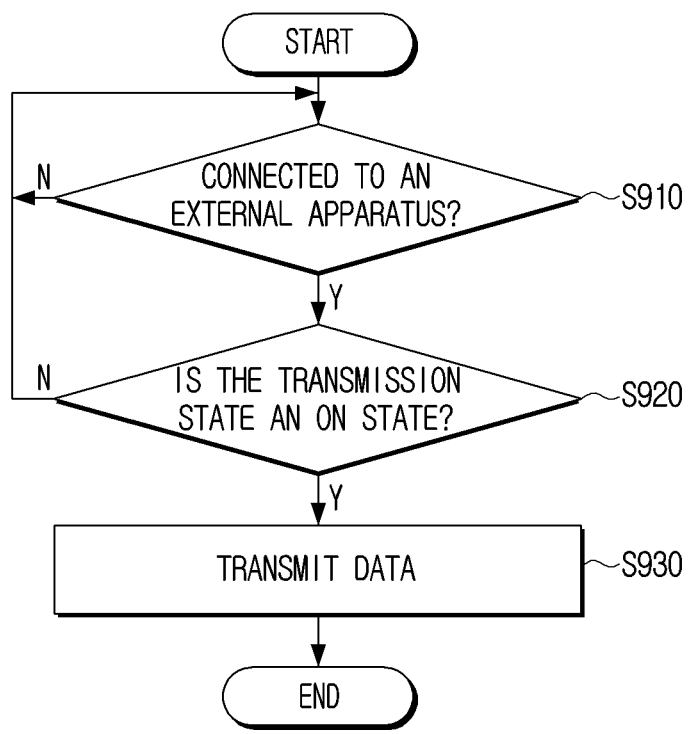
FIG. 9 is a diagram for illustrating an operation of an electronic apparatus according to an embodiment of the disclosure.

FIG. 9 is a diagram for illustrating an operation of an electronic apparatus according to an embodiment of the disclosure.

Referring to FIG. 9, the electronic apparatus 200A according to an embodiment of the disclosure may determine a network connection state with the server apparatus 100 at operation S910. The network connection state may be divided into a state wherein the network connection is maintained or a state wherein the network connection is disconnected. The state wherein the network connection is disconnected may refer to a state wherein data cannot be transmitted and received normally or resources cannot be shared between two apparatuses, and on the contrary, the state wherein the network connection is maintained may refer to a state wherein data can be transmitted and received normally or resources can be shared between two apparatuses.

In case the electronic apparatus 200A is connected with the server apparatus 100 via a network at operation S910, Y, the electronic apparatus 200A may determine the transmission state for data at operation S920. The transmission state for data may be one of an on state or an off state. Meanwhile, unlike this, in case the electronic apparatus 200A is not connected with the server apparatus 100 via a network at operation S910, N, the electronic apparatus 200A may operate not to transmit data to the server apparatus 100.

Then, in case the transmission state for data is an on state at operation S920, Y, the electronic apparatus 200A may operate to transmit data to the server apparatus 100 at operation S930.

Figure 10:
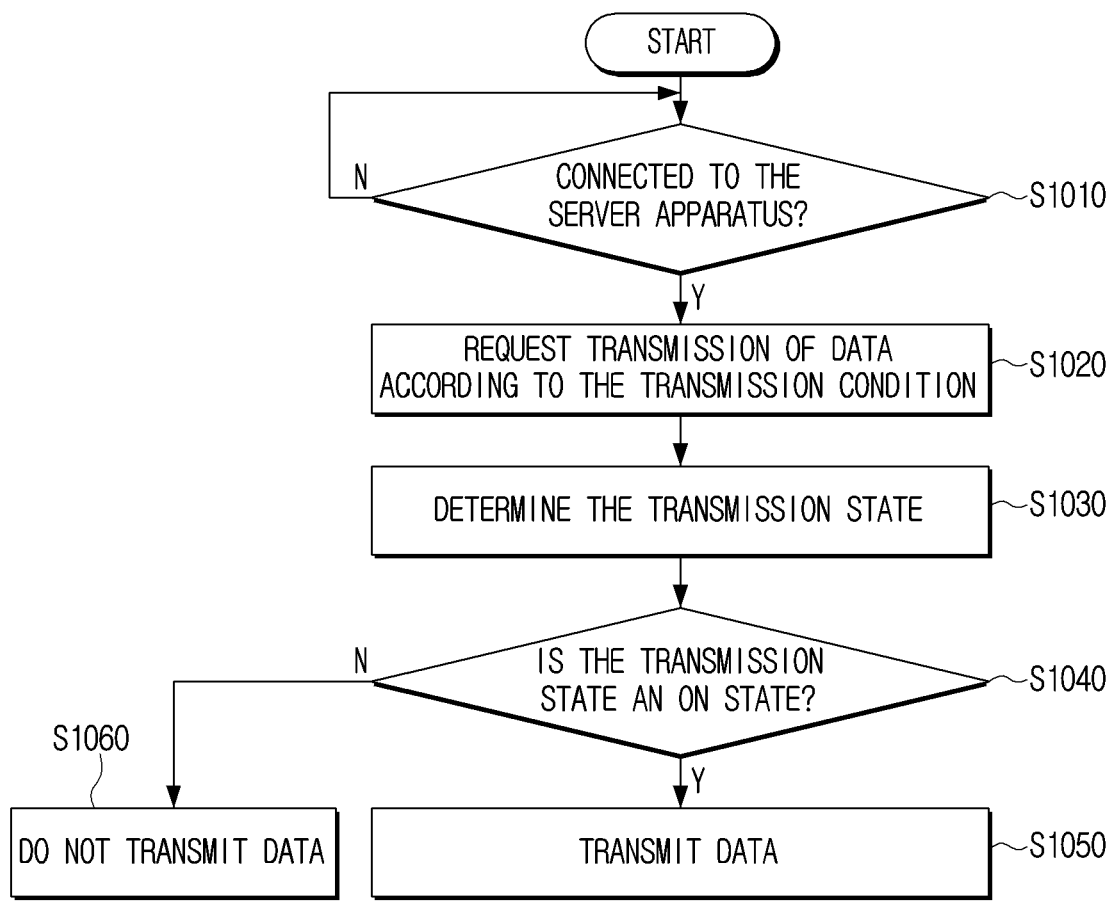
FIG. 10 is a diagram for illustrating a detailed operation of an electronic apparatus according to an embodiment of the disclosure.

FIG. 10 is a diagram for illustrating a detailed operation of an electronic apparatus according to an embodiment of the disclosure. As FIG. 10 specifies the operation in FIG. 9, overlapping contents will be described briefly.

Referring to FIG. 10, the electronic apparatus 200A according to an embodiment of the disclosure may determine the network connection state with the server apparatus 100 at operation S1010.

In case the electronic apparatus 200A is connected with the server apparatus 100 via a network at operation S1010, Y, the electronic apparatus 200A may receive a request for transmitting data according to the transmission condition from the server apparatus 100 at operation S1020. The transmission condition may have been determined based on a request of a service of the user terminal apparatus 200B.

Then, the electronic apparatus 200A may determine the transmission state of data based on the transmission condition at operation S1030. That is, the electronic apparatus 200A may apply a virtual switch in terms of software according to the transmission condition, and determine the transmission state of data as an on state or an off state.

In case the transmission state for data is an on state at operation S1040, Y, the electronic apparatus 200A may operate to transmit data to the server apparatus 100 at operation S1050. Unlike this, in case the transmission state for data is an off state at operation S1040, N, the electronic apparatus 200A may operate not to transmit data to the server apparatus 100 at operation S1060.

As described above, according to an embodiment of the disclosure, only in case data is needed at the user terminal apparatus 200B or the server apparatus 100, the transmission state of the data of the electronic apparatus 200A may be determined as an on state and the electronic apparatus 200A may transmit the data to the server apparatus 100, and in case data is not needed at the user terminal apparatus 200B or the server apparatus 100, the transmission state of the data of the electronic apparatus 200A may be determined as an off state and the electronic apparatus 200A may not transmit the data to the server apparatus 100.

Figure 11:
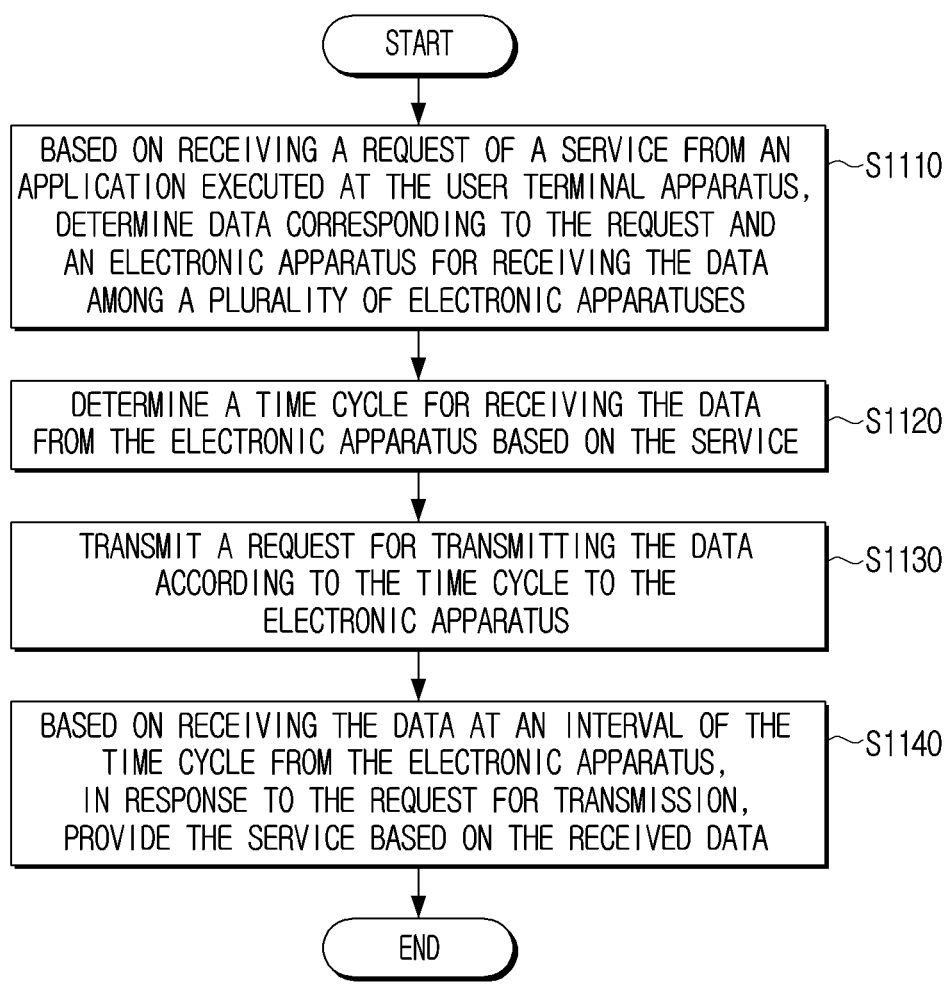
FIG. 11 is a diagram for illustrating a flow chart according to an embodiment of the disclosure.

FIG. 11 is a diagram for illustrating a flow chart according to an embodiment of the disclosure.

Referring to FIG. 11, a method of controlling the server apparatus 100 communicatively connected with a plurality of electronic apparatuses constituting an IoT according to an embodiment of the disclosure includes an operation S1110 of, based on receiving a request of a service from an application executed at the user terminal apparatus 200B, determining data corresponding to the request and an electronic apparatus 200A for receiving the data among the plurality of electronic apparatuses, an operation S1120 of determining a time cycle for receiving the data from the electronic apparatus 200A based on the service, an operation S1130 of transmitting a request for transmitting the data according to the time cycle to the electronic apparatus 200A, and an operation S1140 of, based on receiving the data from the electronic apparatus 200A at an interval of the time cycle, in response to the request for transmission, providing the service based on the received data.

Specifically, if a request of a service is received from an application executed at the user terminal apparatus 200B, data corresponding to the request and an electronic apparatus 200A for receiving the data among the plurality of electronic apparatuses may be determined at operation S1110. The data may include at least one of data for the state of the electronic apparatus 200A acquired from the electronic apparatus 200A or data for the surrounding environment acquired from the electronic apparatus 200A.

Then, the time cycle for receiving the data from the electronic apparatus 200A may be determined based on the service at operation S1120.

The time cycle may include a time interval of transmitting the data acquired by the electronic apparatus 200A to the server apparatus 100 again after transmitting the data acquired by the electronic apparatus 200A to the server apparatus 100.

Meanwhile, the time cycle according to an embodiment of the disclosure may be predetermined according to a service. In this case, in the operation of determining the time cycle, if the requested service is a first service, it may be determined that the time cycle by which the electronic apparatus 200A will transmit the data to the server apparatus 100 is a first time cycle. Also, in the operation of determining the time cycle, if the requested service is a second service, it may be determined that the time cycle by which the electronic apparatus 200A will transmit the data to the server apparatus 100 is a second time cycle longer than the first time cycle.

Meanwhile, the operation of determining the time cycle according to an embodiment of the disclosure may further include the operation of, based on receiving information indicating that provision of the service was completed, or execution of the application was finished from the user terminal apparatus 200B, increasing the time interval of the time cycle.

Meanwhile, in the operation of determining the time cycle according to an embodiment of the disclosure, the time cycle may be determined based on the number of times that the service was requested which was received during a predetermined time period.

Meanwhile, in the operation of determining the time cycle according to an embodiment of the disclosure, the time cycle may be determined based on at least one of the format of the data corresponding to the received request or the size of the data.

Then, a request for transmitting data according to the time cycle may be transmitted to the electronic apparatus 200A at operation S1130. In this case, when the request for transmitting data is received, the electronic apparatus 200A may transmit the data acquired by the electronic apparatus 200A to the server apparatus 100, and transmit the data acquired by the electronic apparatus 200A to the server apparatus 100 at a time point that passed the time cycle.

Then, if the data is received from the electronic apparatus 200A at an interval of the time cycle from the electronic apparatus 200A, in response to the request for transmission, the service may be provided based on the received data at operation S1140.

Meanwhile, the controlling method according to an embodiment of the disclosure may further include the operation of, based on receiving information indicating that provision of the service was completed, or execution of the application was finished from the user terminal apparatus 200B, transmitting a request for stopping transmission of the data to the electronic apparatus 200A.

The various embodiments of the disclosure may be implemented as software including instructions stored in machine-readable storage media, which can be read by machines (e.g.: computers). The machines refer to apparatuses that call instructions stored in a storage medium, and can operate according to the called instructions, and the apparatuses may include the electronic apparatus (e.g.: the electronic apparatus 200A) according to the aforementioned embodiments. In case an instruction is executed by a processor, the processor may perform a function corresponding to the instruction by itself, or by using other components under its control. An instruction may include a code that is generated or executed by a compiler or an interpreter. A storage medium that is readable by machines may be provided in the form of a non-transitory storage medium. The term 'non-transitory' only means that a storage medium does not include signals, and is tangible, but does not indicate whether data is stored in the storage medium semi-permanently or temporarily.

Also, the method according to the various embodiments may be provided while being included in a computer program product. A computer program product refers to a product, and it can be traded between a seller and a buyer. A computer program product can be distributed on-line in the form of a storage medium that is readable by machines (e.g.: a compact disc read only memory (CD-ROM)), or through an application store (e.g.: Play Store™). In the case of on-line distribution, at least a portion of a computer program product may be stored in a storage medium such as the server of the manufacturer, the server apparatus of the application store, and the memory of the relay server at least temporarily, or may be generated temporarily.

Also, among the aforementioned sub components, some sub components may be omitted, or other sub components may be further included in the various embodiments. Generally or additionally, some components (e.g.: a module or a program) may be integrated as an object, and perform the functions that were performed by each of the components before integration identically or in a similar manner A module, a program, or operations performed by other components according to the various embodiments may be executed sequentially, in parallel, repetitively, or heuristically. Or, at least some of the operations may be executed in a different order or omitted, or other operations may be added.

While the disclosure has been shown and described with reference to various embodiments thereof, it will be understood by those skilled in the art that various changes in form and details may be made therein without departing from the spirit and scope of the disclosure as defined by the appended claims and their equivalents.

What is claimed is:

1. A server apparatus communicatively connected with a plurality of electronic apparatuses constituting an internet of things (IoT) comprising:
   a communication interface; and
   a processor configured to:
      based on receiving a request of a service from an application executed in a user terminal apparatus being received through the communication interface, determine data corresponding to the request and an electronic apparatus corresponding to the data among the plurality of electronic apparatuses,
      determine a time cycle for receiving the data from the electronic apparatus based on at least one of a type of the service or a type of data required for performing the service,
      control the communication interface to transmit a request for transmitting the data according to the time cycle to the electronic apparatus, and
      based on receiving the data from the electronic apparatus at an interval of the time cycle through the communication interface, in response to the request for transmission, provide the service based on the received data.

2. The server apparatus of claim 1,
   wherein the time cycle comprises a time interval of transmitting the data acquired by the electronic apparatus to the server apparatus again after transmitting the data acquired by the electronic apparatus to the server apparatus, and
   wherein the request for transmission includes information to configure the electronic apparatus to:
      based on receiving a request for transmitting the data, transmit the data acquired by the electronic apparatus to the server apparatus, and transmit the data acquired by the electronic apparatus to the server apparatus at a time point that passed the time cycle.

3. The server apparatus of claim 1, wherein the data comprises at least one of data for a state of the electronic apparatus acquired from the electronic apparatus or data for a surrounding environment acquired from the electronic apparatus.

4. The server apparatus of claim 1, wherein the time cycle is predetermined according to the service.

5. The server apparatus of claim 4, wherein the processor is further configured to:

based on the requested service being a first service, determine that the time cycle by which the electronic apparatus will transmit the data to the server apparatus is a first time cycle, and based on the requested service being a second service, determine that the time cycle by which the electronic apparatus will transmit the data to the server apparatus is a second time cycle longer than the first time cycle.

6. The server apparatus of claim 1, wherein the processor is further configured to:

based on receiving information indicating that provision of the service was completed, or execution of the application was finished from the user terminal apparatus, transmit a request for stopping transmission of the data to the electronic apparatus through the communication interface.

7. The server apparatus of claim 1, wherein the processor is further configured to:

based on receiving information indicating that provision of the service was completed, or execution of the application was finished from the user terminal apparatus, increase the interval of the time cycle.

8. The server apparatus of claim 1, wherein the processor is further configured to:

determine the time cycle based on a number of times that the service was requested which was received through the communication interface during a predetermined time period.

9. The server apparatus of claim 1, wherein the processor is further configured to:

determine the time cycle based on at least one of a format of the data corresponding to the request received through the communication interface or a size of the data.

10. A method of controlling a server apparatus communicatively connected with a plurality of electronic apparatuses constituting an IoT, the method comprising:

based on receiving a request of a service from an application executed in a user terminal apparatus, determining data corresponding to the request and an electronic apparatus corresponding to the data among the plurality of electronic apparatuses;

determining a time cycle for receiving the data from the electronic apparatus based on at least one of a type of the service or a type of data required for performing the service;

transmitting a request for transmitting the data according to the time cycle to the electronic apparatus; and based on receiving the data from the electronic apparatus at an interval of the time cycle, in response to the request for transmission, providing the service based on the received data.

11. The controlling method of claim 10, wherein the time cycle comprises a time interval of transmitting the data acquired by the electronic apparatus to the server apparatus again after transmitting the data acquired by the electronic apparatus to the server apparatus, and wherein the request for transmission includes information to configure the electronic apparatus to:

based on receiving a request for transmitting the data, transmit the data acquired by the electronic apparatus to the server apparatus, and transmit the data acquired by the electronic apparatus to the server apparatus at a time point that passed the time cycle.

12. The controlling method of claim 10, wherein the data comprises at least one of data for a state of the electronic apparatus acquired from the electronic apparatus or data for a surrounding environment acquired from the electronic apparatus.

13. The controlling method of claim 10, wherein the time cycle is predetermined according to the service.

14. The controlling method of claim 13, wherein the determining the time cycle comprises:

based on the requested service being a first service, determining that the time cycle by which the electronic apparatus will transmit the data to the server apparatus is a first time cycle; and based on the requested service being a second service, determining that the time cycle by which the electronic apparatus will transmit the data to the server apparatus is a second time cycle longer than the first time cycle.

15. The controlling method of claim 10, further comprising:

based on receiving information indicating that provision of the service was completed, or execution of the application was finished from the user terminal apparatus, transmitting a request for stopping transmission of the data to the electronic apparatus.

16. The controlling method of claim 10, wherein the determining of the time cycle further comprises:

based on receiving information indicating that provision of the service was completed, or execution of the application was finished from the user terminal apparatus, increasing the time interval of the time cycle.

17. The controlling method of claim 10, wherein the determining of the time cycle comprises:

determining the time cycle based on a number of times that the service was requested which was received during a predetermined time period.

18. The controlling method of claim 10, wherein the determining of the time cycle comprises:

determining the time cycle based on at least one of a format of the data corresponding to the received request or a size of the data.

19. The controlling method of claim 10, wherein the receiving of the data from the electronic apparatus at the interval of the time cycle occurs when it is determined the electronic apparatus is in an on state and no data is received when it is determined the electronic apparatus is in an off state.

20. The controlling method of claim 19, wherein a state of the electronic apparatus is repeatedly changed from the on state and the off state according to the time cycle.

\* \* \* \* \*